United States Patent [19]

Campbell

[11] 4,097,164

[45] Jun. 27, 1978

[54] TERMINALS ON WIRE ROPE AND STRAND

[75] Inventor: Robert Edward Campbell, Doncaster, England

[73] Assignee: Bridon Limited, England

[21] Appl. No.: 704,298

[22] Filed: Jul. 12, 1976

Related U.S. Application Data

[63] Continuation of Ser. No. 499,652, Aug. 22, 1974, abandoned.

[30] Foreign Application Priority Data

Aug. 28, 1973 United Kingdom ............... 40491/73

[51] Int. Cl.² .......................................... F16G 11/02
[52] U.S. Cl. ................. 403/284; 24/115 A; 403/372
[58] Field of Search ............. 403/165, 284, 285, 274, 403/282, 41, 278, 288, 279, 372; 24/129 W, 115 A, 122.6, 122.3, 114.5; 339/103 R, 103 B

[56] References Cited

U.S. PATENT DOCUMENTS

| 2,945,457 | 7/1960 | Avery et al. ......................... 403/41 |
| 3,281,524 | 10/1966 | Lynch, Jr. et al. .................. 403/284 |
| 3,471,904 | 10/1969 | Aho ................................... 24/115 A |
| 3,861,811 | 1/1975 | Mason et al. ..................... 24/115 A |

Primary Examiner—Kenneth J. Dorner
Attorney, Agent, or Firm—Emrich, Root, O'Keeffe & Lee

[57] ABSTRACT

An elongate terminal body has a longitudinal bore which receives a wire rope or strand. A deformable member surrounds the rope or strand in an enlarged part of the bore adjacent the end at which the rope or strand enters. The terminal body is compressed to grip the rope or strand so that the deformable member is gripped between the terminal body and the rope or strand. The deformable member dissipates transverse and longitudinal vibrations transmitted along the rope or strand towards the terminal body.

4 Claims, 14 Drawing Figures

TERMINALS ON WIRE ROPE AND STRAND

The present application is a continuation of copending application Ser. No. 499,652, filed Aug. 22, 1974 now abandoned.

The present invention relates to the provision of terminals on wire rope and strand.

One known method of terminating a wire rope (or strand) is to brush out the wires at the end of the rope and to pull the brushed end into a conical cavity in a terminal socket, where the rope is secured by encapsulation of the brushed end with molten white metal or zinc. Another known method is to compress a terminal onto the end of a wire rope or strand by swaging or die pressing.

A problem with both these known types of terminal is that vibrations travelling along the rope or strand are transmitted directly to the terminal and that this occurs where the wires are weakest because of the manufacturing process. This can result in premature failure of the rope or strand at the point where it enters the terminal.

The present invention provides a terminal on a wire rope or strand, comprising an elongate terminal body having a longitudinal bore which receives the rope or strand, the bore having an enlarged part adjacent the end at which the rope or strand enters, and a deformable member within the enlarged part of the bore, the deformable member surrounding the rope or strand so as to dissipate transverse and longitudinal vibrations transmitted along the rope or strand towards the terminal body, the terminal body having been compressed to grip the rope or strand so that the rope or strand cannot be withdrawn from the terminal body and so that the deformable member is gripped between the terminal body and the rope or strand.

The invention also provides a method of fitting the above-defined terminal on a rope or strand, in which the terminal body is compressed to grip the rope or strand so that the rope or strand cannot be withdrawn from the terminal body and so that the deformable member is gripped between the terminal body and the rope or strand.

It is preferable for the deformable member to include a collar which closes the end of the enlarged part of the bore at which the rope or strand enters the terminal body. This tends to prevent corrosive substances and foreign matter from entering the bore. For the same reason, the bore should preferably be a blind bore.

The deformable member may be in a single piece or may, preferably, comprise two or more distinct parts. The deformable member may be resilient or plastic or may be partly resilient and partly plastic. Suitable materials are plastics materials, elastomers, and soft metals (softer than the rope and terminal body).

The invention will be described further, by way of example only, with reference to the accompanying drawings, in which.

Figure 7:
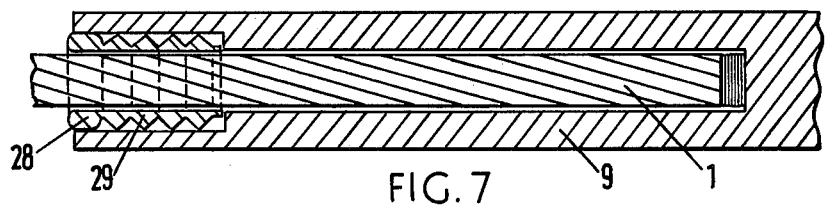
FIG. 7 is a longitudinal section through part of another terminal.
Figure 7A:
Figure 7B:
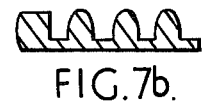
Figure 7C:
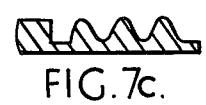
Figure 7D:
Figure 8:
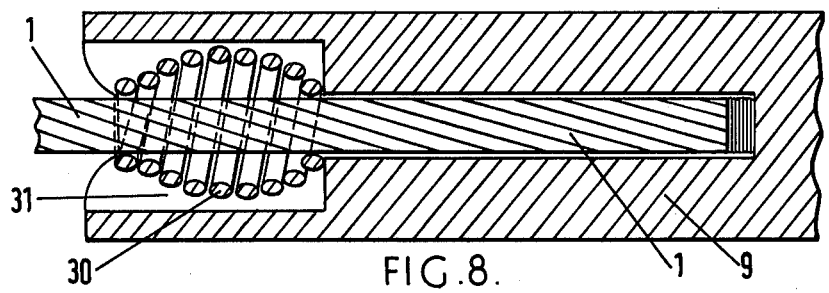

FIG. 7a to d are radial sections through four similar deformable members usable in the terminal body shown in FIG. 7; and FIG. 8 is a longitudinal section through one end of another terminal.

In the drawings, a steel wire rope 1 is fitted with a steel terminal body 9.

Figure 2:
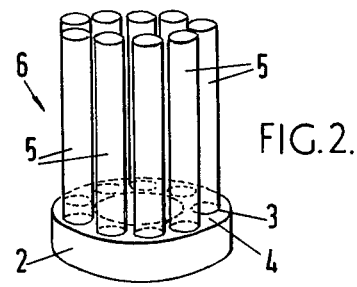
FIG. 2 is an isometric view of part of the terminal of FIG. 1.

The end of the rope 1 is squared off and a soft metal collar or ring 2 and associated rods 5 are put onto the rope. The internal bore of the ring 2 is slightly larger than the diameter of the rope and its face 4 is drilled on a common radius with equi-spaced holes 3, into which ductile metallic or resilient elastomeric rods 5 of equal length and diameter are push fitted or adhesively secured at right angles to the face 4 to form an open ended cage 6 (FIG. 2).

A further component 7 is then put onto the rope. This is a tubular plug 7 of elastomer, e.g. epoxy resin or rubber, the bore of which is only slightly larger than the diameter of the rope; its exterior is convex.

The terminal body 9 comprises a round steel bar of greater length than diameter, which is machined internally from one end to provide a blind bore 8, whose axis is the linear axis of the bar, for approximately three quarters of its length; the diameter of the bore is only slightly larger than the rope it is to accept. The entrance to the blind bore 8, and some quarter of its length, is opened out still further to provide an enlarged parallel-walled cylindrical cavity 10. The opposite end of the body 9 is provided with attachment means consisting of a pair of arms 11 pierced to accept a coupling pin (not shown).

Figure 1:
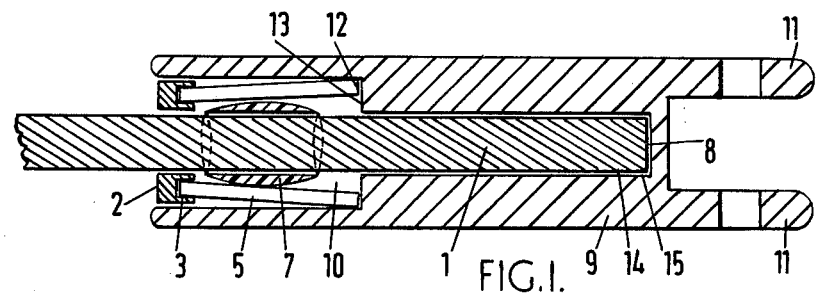
FIG. 1 is a longitudinal section through a terminal on a wire rope, before pressing.

After the end of the rope 1 has been inserted to occupy the full extent of the blind bore 8, the plug 7 is passed back along the rope until it is located mid-way in the cavity 10, followed by the cage 6, so that the extremities 12 of the rods 5 bear against the base 13 of the cavity 10, as shown in FIG. 1.

Figure 3:
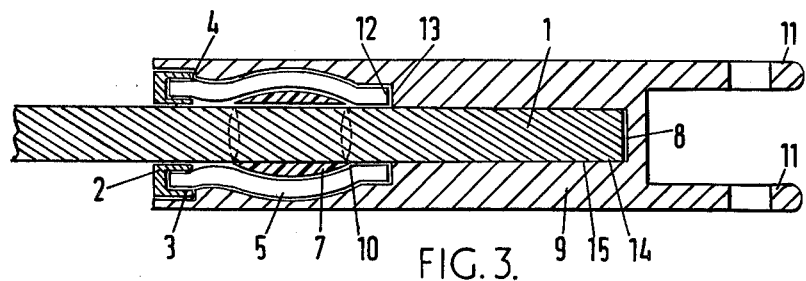
FIG. 3 is a view similar to FIG. 1, after pressing.

When the terminal body 9 is subjected to compression by pressing or swaging, it assumes the configuration shown in FIG. 3. The pressure applied to that part of the terminal body 9 which is accommodating the rope 1 brings the surface 14 of the rope into physical engagement with the inner surface 15 of the body 9. The body 9 thus grips the rope 1 so that it cannot be withdrawn from the terminal; i.e. the load required to withdraw the rope is greater than the breaking load of the rope. Furthermore, the cage 6 is deformed and gripped between the rope 1 and terminal body 9 so that it acts as a damping device within the body terminal, dissipating longitudinal and transverse vibrations (pulses and oscillations) transmitted by the rope. The ring 2 seals off the open end of the cavity 10 to prevent the entry of corrosives.

Figure 4:
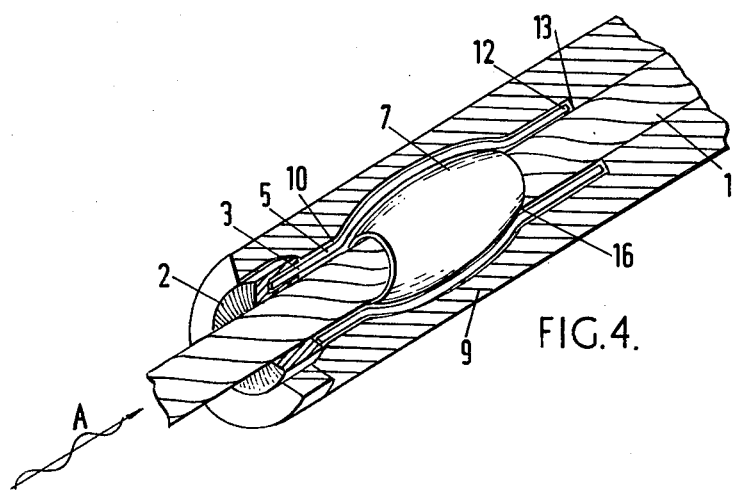
FIG. 4 is a cut-away isometric view of the terminal of FIG. 3.

The operation of the damping device will be more clearly understood from FIG. 4. A longitudinal pulse travelling along the rope in the direction of the arrow "A" attempts to move the collar 2 but the kinetic energy of the pulse is expanded or damped out in the effort to compress the rods 5. A change in pulse frequency or amplitude, or the superimposition of further frequencies whilst the rods are in a state of compression, is dealt with by the resilient plug 7 which bears upon the rods at 16 to effect additional damping.

Cyclic vibration, either longitudinal or transverse, is initially damped by the collar 2 backed up by the plug 7. The device is also capable of nullifying combinations of cyclic pulses in the transverse and longitudinal directions.

Figure 5:
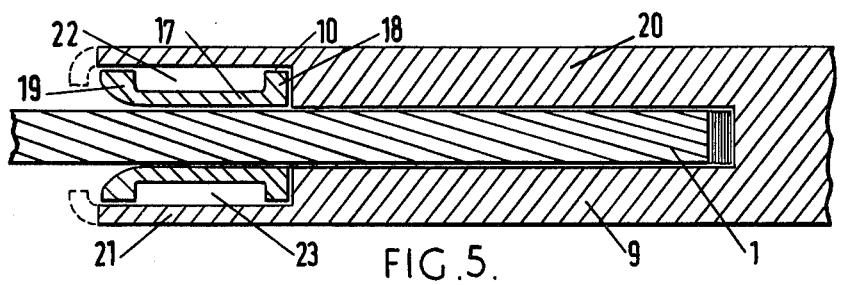
FIG. 5 is a longitudinal section through part of another terminal.

An alternative embodiment is shown in FIG. 5. Here the damping device within the cavity 10 comprises a resilient elastomeric or ductile metallic tube 17 with an integral collar or ring 18, 19 at either end.

When the terminal is assembled, radial pressing or swaging is applied to a region 20 sufficient to secure the rope, up to its breaking load, and a reduced pressure is applied to a region 21 sufficient to provide firm physical engagement of the tube 17 with the rope, and of the walls of the terminal body with the rings 18, 19, but not sufficient to eliminate the air space 23. The walls at the open end of the cavity 10 may be pressed over (as indicated in dotted lines) to assist in retaining the damping device within the cavity.

Figures 5A, 6A:
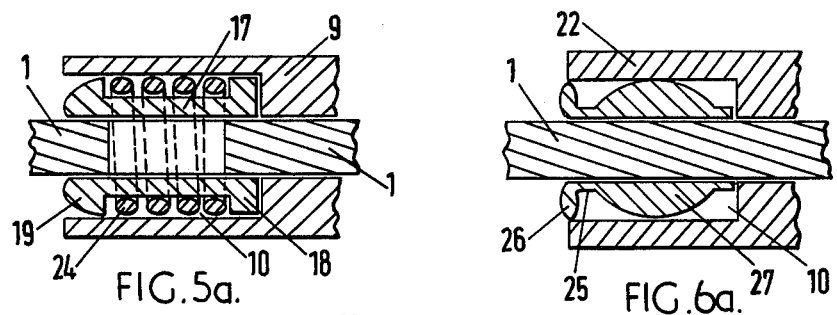
FIG. 5a is a detail of FIG. 5, with the addition of a helical spring.
FIG. 6a is a longitudinal section through part of another terminal, similar to that of FIG. 6.

In those instances where there is likely to be excessive vibratory oscillation along the linear axis of the rope, further damping is afforded by locating a helical spring 24 (FIG. 5a) over the tube 17 between the rings 18, 19.

Figure 6:
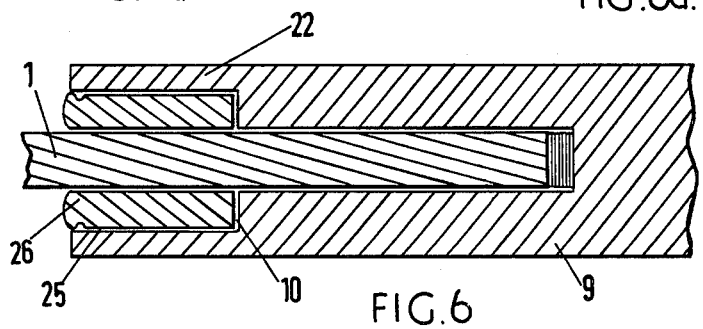
FIG. 6 is a longitudinal section through part of another terminal.

A further embodiment, shown in FIG. 6, has a damping device housed within the cavity 10 and comprising a resilient elastomeric tube 25 of regular thickness with a collar or ring 26 at one end. Alternatively (FIG. 6a) the middle of the tube 25 may be thickened to form convex plug 27.

Yet another embodiment is that illustrated in FIG. 7, in which the damping device comprises collar or ring 28, of elastomeric material, extended at right angles from one face to form a tube 29. The tube has a smooth parallel bore and a corrugated external surface, the apices of the corrugations engaging the wall of the cavity 10. The corrugations may, in cross-section, be triangular (FIG. 7) or of another geometry such as is examplified in FIGS. 7a, 7b, 7c, and 7d.

The final embodiment is that shown in FIG. 8, in which the damping device contained within the cavity 10 comprises a coil spring 30 of eliptical longitudinal section, embedded in a plug 31 of a resilient elastomeric material such as an epoxy-rubber composition.

Various modifications may be made within the scope of the invention. For instance, the materials of which the components of the terminals are made may be selected from a number of alternatives as follows:

ring 2: mild steel, aluminium or an aluminium alloy, or nylon;

rods 5 and plug 7: nylon or vulcanised rubber;

tube 17: nylon, epoxy-rubber, vulcanised rubber, or a ductile metal such as aluminium or an aluminium alloy;

spring 24: steel coated with a plastics material such as polyvinyl chloride or polypropylene;

tubes 25 and 29: nylon, polypropylene, epoxy-rubber, or vulcanised rubber.

I claim:

1. A terminal assembly for underformed wire rope or strand, including in combination:

elongated terminal body means having an open end and a first longitudinal bore portion therein extending substantially intermediate the length of said terminal body means, said first bore portion being adapted to receive and engage the rope or strand upon insertion therein, said terminal body means further having a second longitudinal bore portion integral to said first longitudinal bore portion and extending to said open end of said terminal body means and a plurality of separate and spaced deformable damping member means each comprised of an elongated plastic and resilient material positioned within said second longitudinal bore portion and adapted to surround the rope or strand as the undeformed rope or strand is passed through said second longitudinal bore portion into said first longitudinal bore portion, such that when said terminal body means is radially compressed inwardly, said first bore portion engages and compacts the undeformed rope or strand directly over the whole of its circumference and length within the first longitudinal bore portion thereby preventing the rope or strand from being withdrawn from the terminal body means and said second bore portion engages said plastic and resilient material of said deformable damping member means to cause the same to engage the undeformed wire rope or strand thereby dissipating transverse and longitudinal vibrations transmitted along the rope or strand towards the terminal assembly.

2. A terminal assembly as claimed in claim 1 wherein said deformable damping member means includes a collar member engageable with each of said damping member means to seal the end of said enlarged bore portion having the undeformed rope or strand where the same enters the terminal body to prevent corrosive substances from entering the terminal assembly while dissipating transverse and longitudinal vibrations transmitted along the rope or strand towards the terminal assembly.

3. A terminal assembly as claimed in claim 1 wherein said deformable damping member means further includes a tubular plug member adapted to enclose the undeformed rope or strand, said plug member being engaged and held on the rope or strand by said deformable damping member means and said second bore portion to thereby dissipate endwise and longitudinal vibrations transmitted along the rope.

4. A terminal assembly as claimed in claim 1 in which said first bore portion is a blind bore extending substantially the length of said terminal body means.

* * * * *